US012768955B2

(12) United States Patent
Kim et al.

(10) Patent No.: US 12,768,955 B2
(45) Date of Patent: Oct. 20, 2026

(54) LiDAR APPARATUS HAVING WIDE SCANNING ANGLE RANGE

(71) Applicant: SAMSUNG ELECTRONICS CO., LTD., Suwon-si (KR)

(72) Inventors: Woosung Kim, Suwon-si (KR); Dongjae Shin, Suwon-si (KR); Eunkyung Lee, Suwon-si (KR); Hyunil Byun, Suwon-si (KR); Changbum Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 687 days.

(21) Appl. No.: 18/216,114

(22) Filed: Jun. 29, 2023

(65) Prior Publication Data

US 2024/0192330 A1 Jun. 13, 2024

(30) Foreign Application Priority Data

Dec. 13, 2022 (KR) ........................ 10-2022-0174185

(51) Int. Cl.

*G01C 3/08* (2006.01)
*G01S 7/481* (2006.01)
*G01S 7/4911* (2020.01)
*G01S 7/4912* (2020.01)

(52) U.S. Cl.

CPC ........... *G01S 7/4817* (2013.01); *G01S 7/4911* (2013.01); *G01S 7/4918* (2013.01)

(58) Field of Classification Search

CPC ..... G01S 7/4817; G01S 7/4911; G01S 7/4918
See application file for complete search history.

(56) References Cited

U.S. PATENT DOCUMENTS 10,754,091 B1 8/2020 Nagarajan
2016/0161600 A1 6/2016 Eldada et al.
2019/0361126 A1* 11/2019 Abari .................. H04N 23/698
(Continued)

FOREIGN PATENT DOCUMENTS

WO WO 2022173590 A2 * 8/2022 ............... H01S 5/50

OTHER PUBLICATIONS

Hulme, J. C. et al., "Fully integrated hybrid silicon two dimensional beam scanner", Optics Express, Mar. 9, 2025, vol. 23, No. 5, pp. 5861-5874. (14 pages total).
(Continued)

*Primary Examiner* — Mark Hellner
(74) *Attorney, Agent, or Firm* — Sughrue Mion, PLLC

(57) ABSTRACT

A LIDAR apparatus includes a light source module configured to generate light, an optical transmitter configured to transmit the light generated by the light source module to outside, an optical receiver configured to receive light coming from the outside, an optical detector configured to detect the light received by the optical receiver, and a processor configured to control the operation of each of the light source module and the optical transmitter, wherein the light source module includes a first tunable laser light source configured to emit light in a first wavelength band, a second tunable laser light source configured to emit light in a second wavelength band different from the first wavelength band, and a light selection element configured to select and output one of the lights emitted by the first tunable laser light source and the second tunable laser light source.

19 Claims, 13 Drawing Sheets

(56) References Cited

U.S. PATENT DOCUMENTS

| | | | | |
|---|---|---|---|---|
| 2019/0377135 | A1* | 12/2019 | Mansouri Rad | G01S 7/4811 |
| 2022/0146634 | A1 | 5/2022 | Kim et al. | |
| 2022/0187681 | A1 | 6/2022 | Valentine et al. | |
| 2022/0236417 | A1* | 7/2022 | LaChapelle | G01S 7/4815 |
| 2022/0263289 | A1 | 8/2022 | Nagarajan et al. | |
| 2023/0063732 | A1 | 3/2023 | Shin et al. | |
| 2023/0213628 | A1* | 7/2023 | LaChapelle | G01S 7/4816 356/5.01 |
| 2024/0012147 | A1* | 1/2024 | Tavallaee | G01S 7/4814 |

OTHER PUBLICATIONS

Seok, Tae Joon et al., "Large-scale broadband digital silicon photonic switches with vertical adiabatic couplers", Optica, Jan. 13, 2016, vol. 3, No. 1, pp. 64-70. (7 pages total).

Stanton, Eric J. et al., "Multi-octave spectral beam combiner on ultra-broadband photonic integrated circuit platform", Optics Express, May 4, 2015, vol. 23, No. 9, pp. 11272-11283. (12 pages total).

Dai, Daoxin et al., "Multimode Silicon Photonics Devices", 26th Optoelectronics and Communications Conference (OECC) 2021. (3 pages total).

* cited by examiner

LiDAR APPARATUS HAVING WIDE SCANNING ANGLE RANGE

CROSS-REFERENCE TO RELATED APPLICATION

This application is based on and claims priority under 35 U.S.C. § 119 to Korean Patent Application No. 10-2022-0174185, filed on Dec. 13, 2022, in the Korean Intellectual Property Office, the disclosure of which is incorporated by reference herein in its entirety.

BACKGROUND

1. Field

The disclosure relates to a LIDAR apparatus having a wide scanning angle range.

2. Description of the Related Art

Recently, advanced driving assistance systems (ADAS) having various functions have been commercialized. For example, there has been an increased number of vehicles equipped with functions such as Adaptive Cruise Control (ACC), and Autonomous Emergency Braking System (AEB). For example, an ACC system in a vehicle recognizes a location and speed of another vehicle and reduces the speed of a vehicle if there is a risk of collision and drives the vehicle within a set speed range if there is no risk of collision. Moreover, an AEB system in a vehicle automatically applies braking to prevent collisions when there is a risk of collision by recognizing that another vehicle is in front of the vehicle, and the driver has not respond to the risk or the response method is inappropriate. In addition, it is expected that vehicles capable of autonomous driving will be commercialized in the near future.

Accordingly, the importance of a vehicle radar that provides information about surroundings of a vehicle is gradually increasing. For example, light detection and ranging (LiDAR) apparatuses that measure a distance, speed, azimuth, and position of an object from the time when a laser scattered or reflected returns, changes in the intensity of the laser, changes in the frequency of the laser, and changes in the polarization state of the laser are widely used as vehicle radars.

SUMMARY

Provided is a LIDAR apparatus having a wide scanning angle range.

Additional aspects will be set forth in part in the description which follows and, in part, will be apparent from the description, or may be learned by practice of the presented embodiments of the disclosure.

According to an aspect of the disclosure, there is provide a LIDAR apparatus including: a light source module configured to generate light; an optical transmitter configured to emit the light generated by the light source module to outside the LiDAR apparatus; an optical receiver configured to receive light from outside the LiDAR apparatus; an optical detector configured to detect the light received by the optical receiver; and a processor configured to control an operation of each of the light source module and the optical transmitter, wherein the light source module includes: a first tunable laser light source configured to emit first light in a first wavelength band; a second tunable laser light source configured to emit second light in a second wavelength band different from the first wavelength band; and a light selection element configured to select and output one of the first light and the second light.

The light selection element includes one of a micro-electro mechanical system (MEMS) device, a Mach-Zehnder interferometer, and Liquid crystal on silicon (LCoS) for optically connecting one input terminal selected from a plurality of input terminals to one output terminal under control of the processor.

The light selection element includes: an optical combiner configured to couple light from a plurality of optical paths into one optical path, or a wavelength selective switch configured to diffract incident light of a plurality of different wavelengths at different angles.

Each of the first tunable laser light source and the second tunable laser light source include: a first optical waveguide and a second optical waveguide that are arranged parallel to each other in a first direction, the first optical waveguide and the second optical waveguide extending in a second direction perpendicular to the first direction; a first optical amplifier provided on the first optical waveguide; a second optical amplifier provided on the second optical waveguide and facing the first optical amplifier at a distance in the first direction; a first ring resonator provided between the first optical waveguide and the second optical waveguide, the first ring resonator facing a first end of the first optical amplifier and a first end of the second optical amplifier; and a second ring resonator provided between the first optical waveguide and the second optical waveguide, the second ring resonator facing a second end of the first optical amplifier and a second end of the second optical amplifier.

A first diameter of the first ring resonator of the first tunable laser light source is different from a second diameter of the first ring resonator of the second tunable laser light source, and a third diameter of the second ring resonator of the first tunable laser light source is different from a fourth diameter of the second ring resonator of the second tunable laser light source.

Each of the first optical amplifier and the second optical amplifier include: a lower contact layer, a gain material layer provided on the lower contact layer, and an upper contact layer provided on the gain material layer.

The gain material layer of the first tunable laser light source includes a first semiconductor material having a first composition and a first band gap, wherein the gain material layer of the second wavelength optical amplifier includes a second semiconductor material having a second composition and a second band gap, and wherein the second composition is different from the first composition and the second band gap is different from the first band gap.

Each of the first tunable laser light source and the second tunable laser light source further include: a first resonant wavelength control element configured to adjust a resonant wavelength of the first ring resonator, and a second resonant wavelength control element configured to adjust a resonant wavelength of the second ring resonator.

The first wavelength band and the second wavelength band partially overlap each other.

An interval between a central wavelength of the first tunable laser light source and a central wavelength of the second tunable laser light source is in a range from about 10 nm to about 60 nm, and a full width at half maximum of the central wavelength of each of the first tunable laser light source and emission wavelength bands of the second tunable laser light source is in a range from about 40 nm to about 60 nm.

The processor is further configured to: turn on the first tunable laser light source and turn off the second tunable laser light source, or turn off the first tunable laser light source and turn on the second tunable laser light source.

The processor is further configured to: turn on one of the first tunable laser light source and the second tunable laser light source, and control an emission wavelength of the turned-on tunable laser light source according to an elevation angle of a scanning light.

The light source module further includes: a first wavelength optical amplifier provided on an optical path between the first tunable laser light source and the light selection element to amplify light of a first wavelength band emitted from the first tunable laser light source; and a second wavelength optical amplifier provided on an optical path between the second tunable laser light source and the light selection element to amplify light of a second wavelength band emitted from the second tunable laser light source.

Each of the first wavelength optical amplifier and the second wavelength optical amplifier include: a lower contact layer, a gain material layer provided on the lower contact layer, and an upper contact layer provided on the gain material layer, wherein the gain material layer of the first wavelength optical amplifier includes a first semiconductor material having a first composition and a first band gap, wherein the gain material layer of the second wavelength optical amplifier includes a second semiconductor material having a second composition and a second band gap, and wherein the second composition is different from the first composition and the second band gap is different from the first band gap.

The optical transmitter includes: a plurality of optical modulators arranged in the first direction; and a plurality of grating antennas provided adjacent to a corresponding optical modulator among the plurality of optical modulators in a second direction perpendicular to the first direction and arranged in the first direction.

The optical transmitter further includes: a first wavelength optical amplifier provided for each of the plurality of optical modulators or each of the plurality of grating antennas to amplify light of the first wavelength band; and a second wavelength optical amplifier provided for each of the plurality of optical modulators or each of the plurality of grating antennas to amplify light of the second wavelength band.

The optical transmitter further includes a wavelength selective switch configured to: transmit light of a first wavelength band among incident light to the first wavelength optical amplifier, and transmit light of the second wavelength band to the second wavelength optical amplifier.

The wavelength selective switch is one of a demultiplexer, a directional coupler, an echelle grating, and an arrayed waveguide grating.

The optical transmitter further includes: an optical switch provided on an optical path between a grating antenna, among the plurality of grating antennas and an optical modulator, among the plurality of optical modulators; a first optical attenuator provided on an optical path between a first output end of the optical switch and a first end of the grating antenna; and a second optical attenuator provided on an optical path between a second output end of the optical switch and a second end of the grating antenna.

The processor is further configured to: set an attenuation rate of the first optical attenuator to minimum and set an attenuation rate of the second optical attenuator to maximum when controlling the optical switch to output light to a first output terminal, and set the attenuation rate of the first optical attenuator to maximum and set the attenuation rate of the second optical attenuator to minimum when controlling the optical switch output light to a second output terminal.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
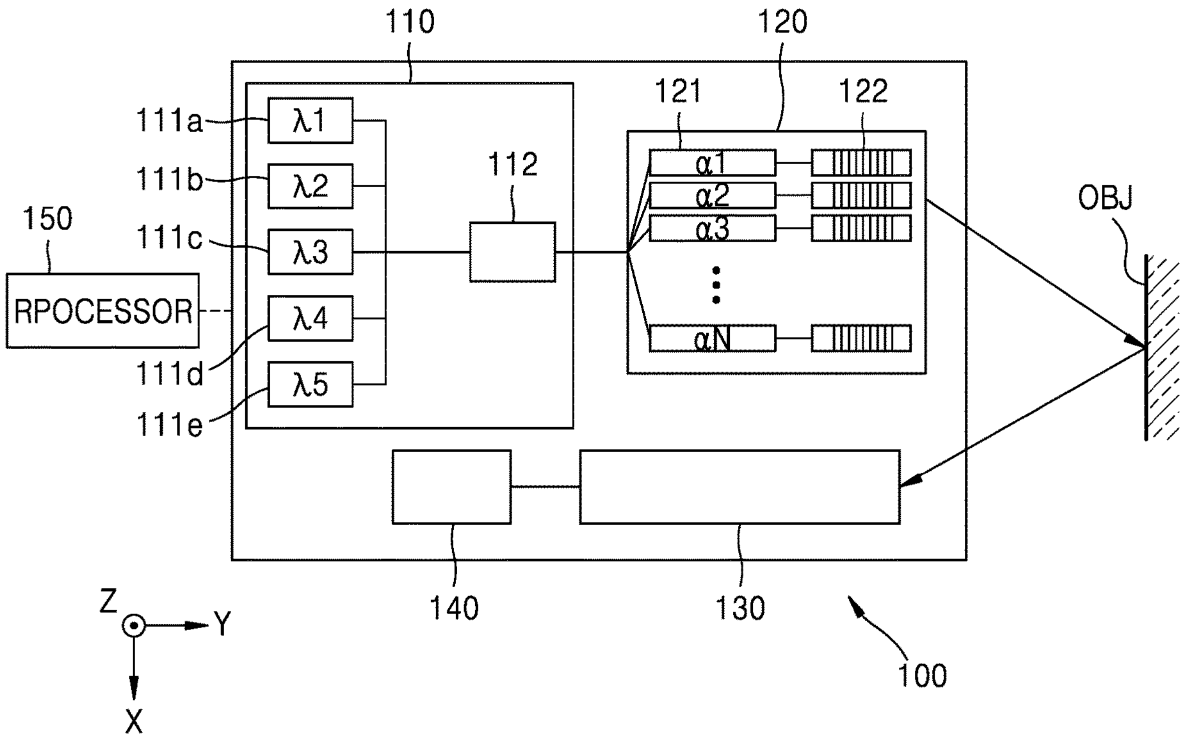
FIG. 1 is a schematic block diagram illustrating a configuration of a LIDAR apparatus according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, a light detection and ranging (LiDAR) apparatus having a wide scanning angle range will be described in detail with reference to the accompanying drawings. In the drawings, like reference numerals denote like elements and sizes of constituent elements may be exaggerated for convenience of explanation and clarity. The embodiments of the disclosure are capable of various modifications and may be embodied in many different forms.

It will be understood that when an element or layer is referred to as being "on" or "above" another element or layer, the element or layer may be directly on another element or layer or intervening elements or layers. Singular forms are intended to include the plural forms as well, unless the context clearly indicates otherwise. It should be understood that, when a part "comprises" or "includes" an element in the specification, unless otherwise defined, it is not excluding other elements but may further include other elements.

In the specification, the term "above" and similar directional terms may be applied to both singular and plural. With respect to operations that constitute a method, the operations may be performed in any appropriate sequence unless the sequence of operations is clearly described or unless the context clearly indicates otherwise. The operations may not necessarily be performed in the order of sequence.

Also, in the specification, the term "units" or " . . . modules" denote units or modules that process at least one function or operation, and may be realized by hardware, software, or a combination of hardware and software.

Connections or connection members of lines between components shown in the drawings illustrate functional connections and/or physical or circuit connections, and the connections or connection members can be represented by replaceable or additional various functional connections, physical connections, or circuit connections in an actual apparatus.

The use of any and all examples, or exemplary language provided herein, is intended merely to better illuminate the disclosure and does not pose a limitation on the scope of the disclosure unless otherwise claimed.

FIG. 1 is a schematic block diagram showing a configuration of a LIDAR apparatus 100 according to an example embodiment. Referring to FIG. 1, the LiDAR apparatus 100 according to an example embodiment includes a light source module 110 configured to generate light, an optical transmitter 120 configured to emit light generated in the light source module 110 outside of the LiDAR apparatus 100, an optical receiver 130 configured to receive light coming from outside of the LiDAR apparatus 100, an optical detector 140 configured to detect light received by the optical receiver 130, and a processor 150 configured to control an operation of the LiDAR apparatus 100.

The light source module 110 may include a plurality of tunable laser light sources 111*a*, 111*b*, 111*c*, 111*d*, and 111*e* emitting light of different wavelength bands. According to an example embodiment, each of the plurality of tunable laser light sources 111*a*, 111*b*, 111*c*, 111*d*, and 111*e* is configured to emit light in a wavelength band different from each other. For example, the light source module 110 may include a first tunable laser light source 111*a* configured to emit light of a first wavelength band λ1, a second tunable laser light source 111*b* configured to emit a second wavelength band λ2 different from the first wavelength band λ1, a third tunable laser light source 111*c* configured to emit light of a third wavelength band λ3 different from the first and second wavelength bands λ1 and λ2, a fourth tunable laser light source 111*d* configured to emit light of a fourth wavelength band λ4 different from the first to third wavelength bands λ1, λ2, and λ3, and a fifth tunable laser light source 111*e* configured to emit light of a fifth wavelength band λ5 different from the first to fourth wavelength bands λ1, λ2, λ3, and λ4.

The first tunable laser light source 111*a* may be configured to emit light of a first wavelength within the first wavelength band λ1 according to electrical control. The second tunable laser light source 111*b* may be configured to emit light of a second wavelength within the second wavelength band λ2 according to electrical control. The third tunable laser light source 111*c* may be configured to emit light of a third wavelength within the third wavelength band λ3 according to electrical control. The fourth tunable laser light source 111*d* may be configured to emit light of a fourth wavelength within the fourth wavelength band λ4 according to electrical control. The fifth tunable laser light source 111*e* may be configured to emit light of a fifth wavelength within the fifth wavelength band λ5 according to electrical control. For example, each of the first wavelength, the second wavelength, the third wavelength, the fourth wavelength and the fifth wavelength may be one of a plurality of wavelengths in the respect wavelength bands, among the first wavelength band λ1, the second wavelength band λ2, the third wavelength band λ3, the fourth wavelength band λ4, and the fifth wavelength band λ5. In the example embodiment illustrated in FIG. 1, the light source module 110 includes five tunable laser light sources 111*a*, 111*b*, 111*c*, 111*d*, and 111*e*, however, the disclosure is not necessarily limited thereto, and as such, according to another example embodiment, the number of tunable laser light sources may be appropriately selected in consideration of a bandwidth of the tunable laser light source, the scanning range of the LiDAR apparatus 100, and the like.

The light source module 110 may further include a light selection element 112 for selecting and outputting one of light from the first to fifth tunable laser light sources 111*a*, 111*b*, 111*c*, 111*d*, and 111*e*. The light selection element 112 may be an active element or a passive element. In the case when the light selection element 112 is an active element, the light selection element 112 may select one of light incident on a plurality of input terminals according to electrical control by the processor 150 and output the selected light to one output terminal. In other words, the light selection element 112 may select one of light incident on a plurality of input terminals and optically connect the light to one output terminal under the control of the processor 150. For example, the light selection element 112 may be implemented with at least one of a micro electro mechanical systems (MEMS) device, a Mach-Zehnder interferometer, and a liquid crystal on silicon (LCoS). In the case when the light selection element 112 is a passive element, the light selection element 112 may include an optical combiner that couples light coming from a plurality of optical paths into one optical path or a wavelength selective switch (WSS) that diffracts at different angles light of a plurality of different wavelengths incident at different angles. For example, the WSS may be implemented with at least one of a directional coupler, an echelle grating, or an arrayed waveguide grating (AWG).

Figure 2:
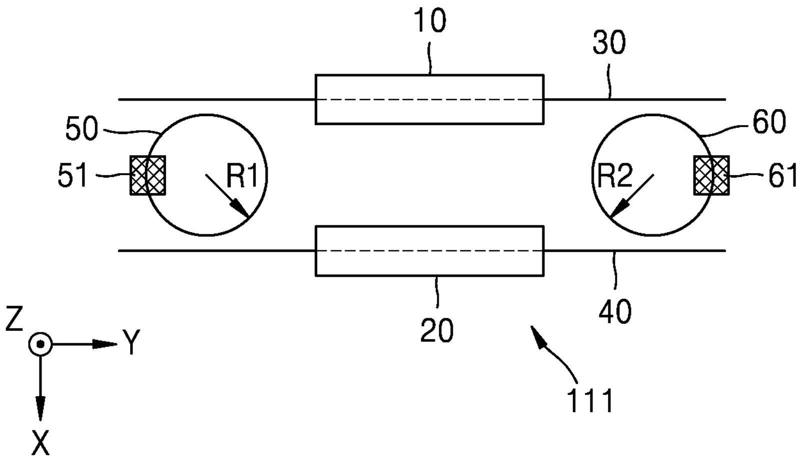
FIG. 2 is a diagram illustrating an example configuration of each tunable laser light source.

FIG. 2 is a diagram illustrating an example configuration of one of the tunable laser light sources 111*a* to 111*e* illustrated in FIG. 1 according to an example embodiment. For convenience of explanation, FIG. 2 shows a tunable laser light source 111, which may correspond to any one of the tunable laser light sources 111*a* to 111*e*. According to an example embodiment, each of the tunable laser light sources 111*a* to 111*e* may have a same configuration as illustrated in FIG. 2. However, the disclosure is not limited thereto, and as such, one or more of the tunable laser light sources 111*a* to 111*e* may not be limited to the configuration illustrated in FIG. 2, and thus may have a different configuration. Referring to FIG. 2, the tunable laser light source 111 may include a first optical waveguide 30, a second optical waveguide 40, a first optical amplifier 10, a second optical amplifier 20, a first ring resonator 50, a second ring resonator 60, a first resonant wavelength control element 51, and a second resonant wavelength control element 61. According to an example embodiment, the first optical waveguide 30 and the second optical waveguide 40 may be arranged parallel to each other. The first optical amplifier 10 may be provided on the first optical waveguide 30, and the second optical amplifier 20 may be provided on the second optical waveguide 40. The first ring resonator 50 and the second ring resonator 60 may be provided between the first optical waveguide 30 and the second optical waveguide 40. The first resonant wavelength control element 51 may be configured to adjust a resonant wavelength of the first ring resonator 50, and the second resonant wavelength control element 61 may be configured to adjust a resonant wavelength of the second ring resonator 60. According to an example embodiment, the tunable laser light source 111 may be an on-chip type wavelength tunable laser in which components are integrated on a substrate. For example, all components of the tunable laser light source 111 may be integrated on a single substrate.

The first optical waveguide 30 and the second optical waveguide 40 may be provided on the substrate, and arranged to face each other with a distance from each other in a first direction (i.e., an X direction). In addition, each of the first optical waveguide 30 and the second optical waveguide 40 may extend in a second direction (i.e., a Y direction) perpendicular to the first direction.

The first optical amplifier 10 and the second optical amplifier 20 may be semiconductor optical amplifiers (SOA) integrated on a substrate using a semiconductor process. The first optical amplifier 10 and the second optical amplifier 20 may serve to amplify light and simultaneously generate light. For example, the first optical amplifier 10 may be configured to generate light and provide the light to the first optical waveguide 30 and, at the same time, to amplify light traveling along the first optical waveguide 30. Also, the second optical amplifier 20 may be configured to generate light and provide the light to the second optical waveguide 40 while amplifying light traveling along the second optical waveguide 40. The first optical amplifier 10 on the first optical waveguide 30 and the second optical amplifier 20 on the second optical waveguide 40 may be spaced apart from each other with a gap in the first direction and may extend in the second direction.

The first ring resonator 50 and the second ring resonator 60 may be provided between the first optical waveguide 30 and the second optical waveguide 40 in a first direction, and may be provided so that the first optical amplifier 10 and the second optical amplifier 20 are interposed therebetween in the second direction. For example, the first ring resonator 50 may be provided between the first optical waveguide 30 and the second optical waveguide 40 in the first direction near a first end of the first optical amplifier 10 and a first end of the second optical amplifier 20 in the second direction. In addition, the second ring resonator 60 may be provided between the first optical waveguide 30 and the second optical waveguide 40 in the first direction near a second end of the first optical amplifier 10 and a second end of the second optical amplifier 20 opposite the first end in the second direction. For example, the first ring resonator 50 may be provided at a first position at a first side of the first optical amplifier 10 and a first side of the second optical amplifier 20, and the second ring resonator 60 may be provided at a second position at a second side of the first optical amplifier 10 and a second side of the second optical amplifier 20. Although FIG. 2 illustrates a tunable laser light source 111 that includes two ring resonators, the disclosure is not limited thereto, and as such, according to another example embodiment, a tunable laser light source may include three or more ring resonators as needed. In this case, the three or more ring resonators may be provided between the first optical amplifier 10 and the second optical amplifier 20 at various locations. Hereinafter, for convenience, a case in which the tunable laser light source 111 has two ring resonators as an example will be described.

According to an example embodiment, the first ring resonator 50 and the second ring resonator 60 do not physically contact the first optical waveguide 30 and the second optical waveguide 40. However, the first ring resonator 50 and the second ring resonator 60 but may be provided to be optically coupled to the first optical waveguide 30 and the second optical waveguide 40. The shortest distance between the first optical waveguide 30 and the first ring resonator 50, the shortest distance between the first optical waveguide 30 and the second ring resonator 60, the shortest distance between the second optical waveguide 40 and the first ring resonator 50, and the shortest distance between the second optical waveguide 40 and the second ring resonator 60 may be less than or equal to about twice a width of the first and second optical waveguides 30 and 40, for example, in a range from about 0.5 times to about 1 time the width of the first and second optical waveguides 30 and 40. For example, the shortest distance between the first optical waveguide 30 and the first ring resonator 50, the shortest distance between the first optical waveguide 30 and the second ring resonator 60, the shortest distance between the second optical waveguide 40 and the first ring resonator 50, and the shortest distance between the second optical waveguide 40 and the second ring resonator 60 may be in a range from about 0.1 μm or to about 1 μm, but are not limited thereto. Accordingly, light traveling along the first optical waveguide 30 or the second optical waveguide 40 may be transmitted to the first ring resonator 50 or the second ring resonator 60, and a part of light resonating in the first ring resonator 50 or the second ring resonator 60 may be transmitted to the first optical waveguide 30 or the second optical waveguide 40.

The first ring resonator 50 and the second ring resonator 60 are closed-loop resonators having ring-shaped waveguides. Wavelengths of light resonating in closed-loop resonators having ring-shaped waveguides may vary depending on diameters or circumferential lengths of the ring-shaped waveguide. In other words, the resonance wavelengths of the first ring resonator 50 and the second ring resonator 60 may vary depending on the diameters or the circumferential lengths of the first ring resonator 50 and the second ring resonator 60. A diameter R1 of the first ring resonator 50 and a diameter R2 of the second ring resonator 60 may be the same or different. In other words, the resonant wavelength of the first ring resonator 50 and the resonant wavelength of the second ring resonator 60 may be the same or different.

In addition, the first and second ring resonators 50 and 60 of the first to fifth tunable laser light sources 111*a*, 111*b*, 111*c*, 111*d*, and 111*e* shown in FIG. 1 may have different resonance wavelengths. For example, the first ring resonators 50 of the first to fifth tunable laser light sources 111*a*, 111*b*, 111*c*, 111*d*, and 111*e* may have different diameters or resonance wavelengths, and the second ring resonators 60 of the first to fifth tunable laser light sources 111*a*, 111*b*, 111*c*, 111*d*, and 111*e* may have different diameters or resonant wavelengths.

The resonant wavelength of the first ring resonator 50 may be finely adjusted by the first resonant wavelength control element 51, and the resonant wavelength of the second ring resonator 60 may be finely adjusted by the second resonant wavelength control element 61. For example, the first and second resonant wavelength control elements 51 and 61 may change a phase of light traveling along the first and second ring resonators 50 and 60, respectively. That is, the first resonant wavelength control element 51 may change a phase of light traveling along the first ring resonator 50 and the second resonant wavelength control element 61 may change a phase of light traveling along the second ring resonators 60. When a phase of light changes, an effect of changing an optical length of a closed-curve waveguide occurs, and thus, the resonant wavelengths of the first and second ring resonators 50 and 60 change. For example, when a phase delay of light increases, the optical length of the closed-curve waveguide increases, and thus, the resonant wavelengths of the first and second ring resonators 50 and 60 may be increased. Conversely, when a phase delay of light decreases, the optical length of the closed-curve waveguide shortens, and thus, the resonant wavelengths of the first and second ring resonators 50 and 60 may be reduced.

The first and second resonant wavelength control elements 51 and 61 may be implemented in a method of changing a temperature or concentration of carriers (e.g., electrons or holes) of the first and second ring resonators 50 and 60. For example, the temperature change method is a method of changing a refractive index of the first and second ring resonators 50 and 60 by changing a temperature around the first and second ring resonators 50 and 60, and thus, the resonance wavelengths of the first and second ring resonators 50 and 60 may be adjusted. In addition, the carrier concentration change method is a method of changing a refractive index of the first and second ring resonators 50 and 60 through a carrier concentration change by placing a diode junction around the center of the first and second ring resonators 50 and 60, and thus, the resonance wavelengths of the first and second ring resonators 50 and 60 may be adjusted.

In FIG. 2, as an example, it is depicted that one first and second resonant wavelength control element 51 and 61 is provided for each of the first and second ring resonators 50 and 60, but the number of resonance wavelength control elements 51 and 61 is not limited thereto. For example, although one of the first and second resonant wavelength control elements 51 and 61 may be provided for each of the first and second ring resonators 50 and 60, a plurality of first and second resonant wavelength control elements 51 and 61 may be provided. For example, the first ring resonator 50 may include a plurality of first resonant wavelength control elements 51 and the second ring resonator 60 may include a plurality of second resonant wavelength control elements 61.

The first and second resonant wavelength control elements 51 and 61 may be electrically controlled by the processor 150. The processor 150 may control the resonance wavelengths of the first and second ring resonators 50 and 60 by controlling the first and second resonance wavelength control elements 51 and 61. Light output from the tunable laser light source 111 may have a wavelength that satisfies both the resonance condition of the first ring resonator 50 and the resonance condition of the second ring resonator 60. Accordingly, a wavelength of light output from the tunable laser light source 111 may be adjusted by controlling the first and second resonant wavelength control elements 51 and 61.

Figure 3:
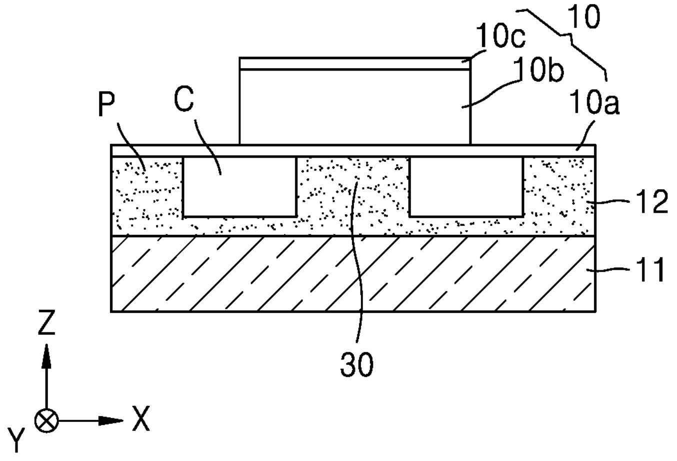
FIG. 3 is a diagram showing a cross-sectional structure of a first optical waveguide and a first optical amplifier of the tunable laser light source shown in FIG. 2.

FIG. 3 is a diagram showing a cross-sectional structure of the first optical waveguide 30 and the first optical amplifier 10 of the tunable laser light source 111 shown in FIG. 2. Referring to FIG. 3, the tunable laser light source 111 may include a substrate 11, a waveguide layer 12 on the substrate 11, and the first optical amplifier 10 on the waveguide layer 12. According to an example embodiment, the tunable laser light source 111 may further include a cladding layer covering the first optical amplifier 10.

The substrate 11 may include a semiconductor layer and a dielectric layer provided above the semiconductor layer. The semiconductor layer may include, for example, a semiconductor material, such as silicon (Si), a Group III-V compound semiconductor, a Group II-VI compound semiconductor, or germanium (Ge), but is not necessarily limited thereto. Also, the dielectric layer may include a dielectric material, for example, silicon oxide ($SiO_2$), silicon nitride (SiN), or aluminum oxide ($Al_2O_3$), but is not necessarily limited thereto. The dielectric layer may be provided over an entire area of an upper surface of the semiconductor layer. For example, the substrate 11 may include a single silicon-on-insulator (SOI) substrate.

The waveguide layer 12 may be provided on an upper surface of the substrate 11. The first optical waveguide 30 may be is provided in the waveguide layer 12. According to an example embodiment, the first optical waveguide 30 may be formed by patterning a portion of the upper surface of the waveguide layer 12. The first optical waveguide 30 may extend in a second direction within the waveguide layer 12. The waveguide layer 12 or the first optical waveguide 30 may include a semiconductor material, such as silicon (Si), a Group III-V compound semiconductor, a Group II-VI compound semiconductor, or germanium (Ge), but is not necessarily limited thereto. In FIG. 3, as an example, it is depicted that the first optical waveguide 30 is a rib waveguide having one vertical protrusion, but is not necessarily limited thereto. For example, the first optical waveguide 30 may be a rib waveguide having a plurality of vertical protrusions (P) or a channel (C) waveguide without protrusions. According to an example embodiment, the second optical waveguide 40 may also be provided in the waveguide layer 12 at a distance from the first optical waveguide 30 in the first direction.

The first optical amplifier 10 may be provided on the first optical waveguide 30. The first optical amplifier 10 may include, for example, a lower contact layer 10*a* provided on the first optical waveguide 30, a gain material layer 10*b* provided on the lower contact layer 10*a*, and an upper contact layer 10*c* provided on the gain material layer 10*b*. According to an example embodiment, a second optical amplifier 20 having the same structure as the first optical amplifier 10 may be provided on the second optical waveguide 40.

The lower contact layer 10*a*, the gain material layer 10*b*, and the upper contact layer 10*c* may include a semiconductor material having a direct bandgap. For example, the lower contact layer 10*a*, the gain material layer 10*b*, and the upper contact layer 10*c* may include a semiconductor material, such as a Group III-V compound semiconductor or a Group II-VI compound semiconductor.

The lower contact layer 10*a* and the upper contact layer 10*c* form an ohmic contact for applying a current to the gain material layer 10*b*. Accordingly, the lower contact layer 10*a* and the upper contact layer 10*c* may be highly doped with electrically opposite conductivity types. For example, the lower contact layer 10*a* may be doped with an n-type and the upper contact layer 10*c* may be doped with a p-type, or the lower contact layer 10*a* may be doped with a p-type and the upper contact layer 10*c* may be doped with an n-type.

The gain material layer 10*b* may generate light according to an applied current and amplify the light. For example, the gain material layer 10*b* may include a multiple quantum well (MQW) structure having a plurality of barriers and a plurality of quantum wells alternately stacked in a vertical direction. A wavelength band and bandwidth of light generated from the gain material layer 10*b* may vary according to a band gap of a semiconductor material forming the gain material layer 10*b* and a thickness of the quantum wells. For example, in the first to fifth tunable laser light sources 111*a*, 111*b*, 111*c*, 111*d*, and 111*e* shown in FIG. 1, the composition and the band gap of the semiconductor material of gain material layers 10*b* may be different from each other. Accordingly, the first to fifth tunable laser light sources 111*a*, 111*b*, 111*c*, 111*d*, and 111*e* may emit light in different wavelength bands.

Figure 4:
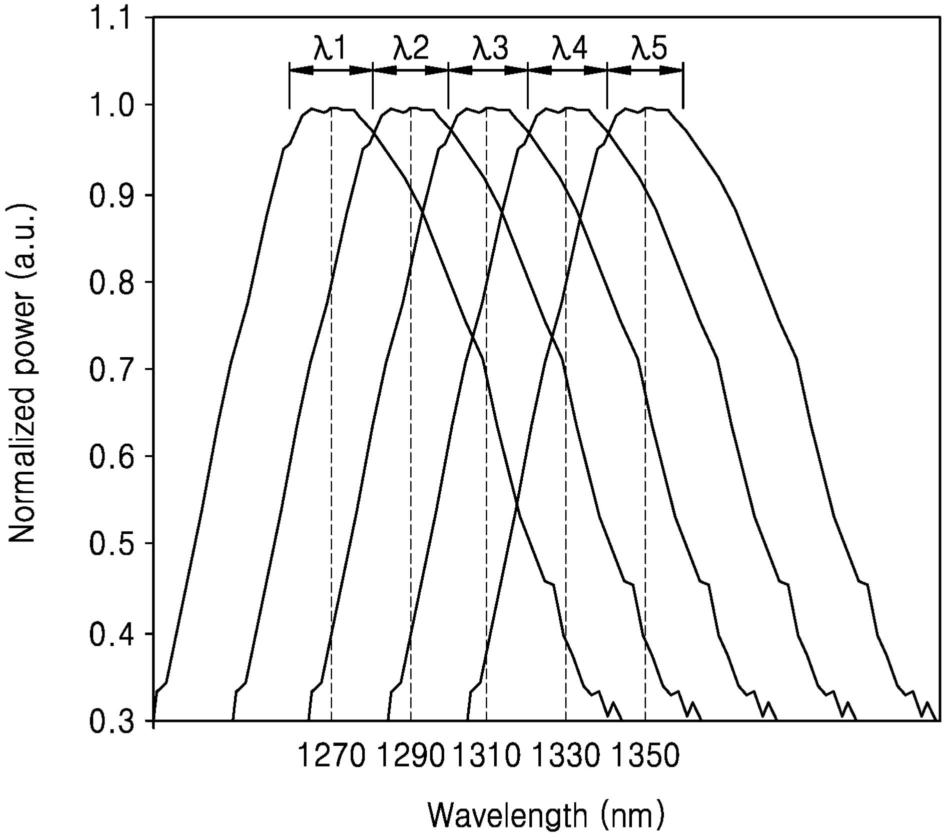
FIG. 4 is a graph showing a spectrum of light emitted from a plurality of tunable laser light sources.

FIG. 4 is a graph showing a spectrum of light emitted from a plurality of tunable laser light sources. Referring to FIG. 4, the first to fifth tunable laser light sources 111*a*, 111*b*, 111*c*, 111*d*, and 111*e* may have center wavelengths different from each other, and a wavelength interval between the center wavelengths may be substantially constant. For example, the center wavelength of the first tunable laser light source 111*a* may be about 1270 nm, the center wavelength of the second tunable laser light source 111*b* may be about 1290 nm, the center wavelength of the third tunable laser light source 111*c* may be about 1310 nm, the center wavelength of the fourth tunable laser light source 111*d* may be about 1330 nm, and the center wavelength of the fifth tunable laser light source 111*e* may be about 1350 nm. In this case, a wavelength interval between the central wavelengths may be about 20 nm.

Also, the first to fifth tunable laser light sources 111*a*, 111*b*, 111*c*, 111*d*, and 111*e* may have wavelength bands that partially overlap each other. For example, the first to fifth tunable laser light sources 111*a*, 111*b*, 111*c*, 111*d*, and 111*e* may each have a full width at half maximum (FWHM) of emission wavelength bands in a range from about 40 nm to about 60 nm. In this case, the processor 150 may control to output light by selecting a tunable laser light source that emits light with the greatest intensity within the overlapping wavelength band. For example, when emitting light within the first wavelength band λ1 of about 1280 nm or less, the processor 150 may turn on only the first tunable laser light source 111*a* and turn off the remaining tunable laser light sources. In addition, when emitting light within the second wavelength band λ2 in a range of about 1280 nm to about 1300 nm, the processor 150 may turn on only the second tunable laser light source 111*b* and turn off the remaining tunable laser light sources. When emitting light within the third wavelength band λ3 in a range of about 1300 nm to about 1320 nm, the processor 150 may turn on only the third tunable laser light source 111*c* and turn off the remaining tunable laser light sources. When emitting light within the fourth wavelength band λ4 in a range of about 1320 nm to about 1340 nm, the processor 150 may turn on only the fourth tunable laser light source 111*d* and turn off the remaining tunable laser light sources. When emitting light within the fifth wavelength band λ5 in a range of about 1340 nm or more, the processor 150 may turn on only the fifth tunable laser light source 111*e* and turn off the remaining tunable laser light sources.

According to an example embodiment, the light selection element 112 is an active element. In this case, the processor 150 may control the operation of the light selection element 112. For example, when turning on the first tunable laser light source 111*a*, the processor 150 may control the light selection element 112 so that an input terminal of the light selection element 112 connected to the first tunable laser light source 111*a* is optically connect to an output terminal of the light selection element 112. In other words, the processor 150 may control the light selection element 112 so that an input terminal of the light selection element 112 connected to a turned on tunable laser light source among the first to fifth tunable laser light sources 111*a*, 111*b*, 111*c*, 111*d*, and 111*e* is optically connect to an output terminal of the light selection element 112.

Meanwhile, the values of the wavelength bands described with reference to FIG. 4 are merely examples for convenience of explanation, and are not limited to the values illustrated in FIG. 4. The wavelength range of light emitted from each tunable laser light source may be variously selected depending on a wavelength range and the number of tunable laser light sources actually used in the LiDAR apparatus 100. For example, an interval between the central wavelengths of the first to fifth tunable laser light sources 111*a*, 111*b*, 111*c*, 111*d*, and 111*e* may be in a range from about 10 nm to about 60 nm.

Referring back to FIG. 1, the optical transmitter 120 may be implemented in an optical phased array (OPA) method. For example, the optical transmitter 120 may include a plurality of optical modulators 121 and a plurality of grating antennas 122. According to an example embodiment, the optical transmitter 120 may further include a plurality of light splitters and a plurality of optical waveguides. Light emitted from the light source module 110 may travel in the second direction (i.e., the Y direction) through the plurality of optical waveguides. The plurality of light splitters may be arranged so that light is split in the first direction (i.e., an X direction) while propagating in the second direction. The plurality of optical modulators 121 may be arranged in the first direction. In addition, the plurality of grating antennas 122 may be provided adjacent to corresponding optical modulators among the plurality of optical modulators 121 in the second direction and may be arranged in the first direction.

Light divided by a plurality of light splitters may be phase modulated by the plurality of optical modulators 121 while propagating along a plurality of optical waveguides. The plurality of optical modulators 121 may independently modulate the phase of light under the control of the processor 150. Then, the light may be emitted to the outside of the LiDAR apparatus 100 through the plurality of grating antennas 122. Each of the plurality of grating antennas 122 may include a plurality of grating patterns for emitting light to the outside. A direction in which light is emitted may be determined according to phases and wavelengths of light provided to the plurality of grating antennas 122. For example, the emission direction of light may be controlled in a first direction or an azimuth direction according to phases of light provided to the plurality of grating antennas 122. In addition, the emission direction of light may be controlled in a third direction (i.e., a Z direction) or in an elevation angle direction according to a wavelength of light provided to the optical transmitter 120 or the plurality of grating antennas 122.

The processor 150 may control wavelengths of light provided to the optical transmitter 120 or the plurality of grating antennas 122 by controlling the light source module 110. In particular, the processor 150 may turn on one of the first to fifth tunable laser light sources 111*a*, 111*b*, 111*c*, 111*d*, and 111*e* according to an elevation angle of scanning light, and may control an emission wavelength of the turned-on tunable laser light source. Also, the processor 150 may control the operation of the optical transmitter 120. For example, the processor 150 may control a phase of the light provided to the plurality of grating antennas 122 by controlling the plurality of optical modulators 121 according to an azimuth angle of scanning light. By control a wavelength and phase of light provided to the plurality of grating antennas 122 in this manner, the LiDAR apparatus 100 may perform two-dimensional beam scanning for an object OBJ in front of the LiDAR apparatus 100.

The optical receiver 130 receives light reflected from an object OBJ in front. The optical receiver 130 may receive all light coming from the outside toward the LIDAR apparatus 100, but may be configured to receive light coming from a direction in which the optical transmitter 120 transmits light. For example, the optical receiver 130 may be implemented in an OPA method. The optical detector 140 may generate an electrical signal based on the intensity of light provided from the optical receiver 130.

The processor 150 may control the operations of the light source module 110, the optical transmitter 120, and the optical receiver 130, and based on a signal received from the optical detector 140, may extract distance information or speed information about an external object OBJ. For example, the processor 150 may extract distance information or speed information about the external object OBJ using a time of flight (TOF) method or a frequency modulated continuous wave (FMCW) method. The processor 150 may be implemented as, for example, a dedicated semiconductor chip, or as software that may be executed in a computer and stored in a non-transitory computer-readable recording medium. In another example embodiment, the processor 150 may be implemented as a programmable logic controller (PLC) or a field-programmable gate array (FPGA). In addition, the processor 150 may be mounted on one substrate together with the light source module 110, the optical transmitter 120, the optical receiver 130, and the optical detector 140, or may be mounted on a separate substrates.

Figure 5:
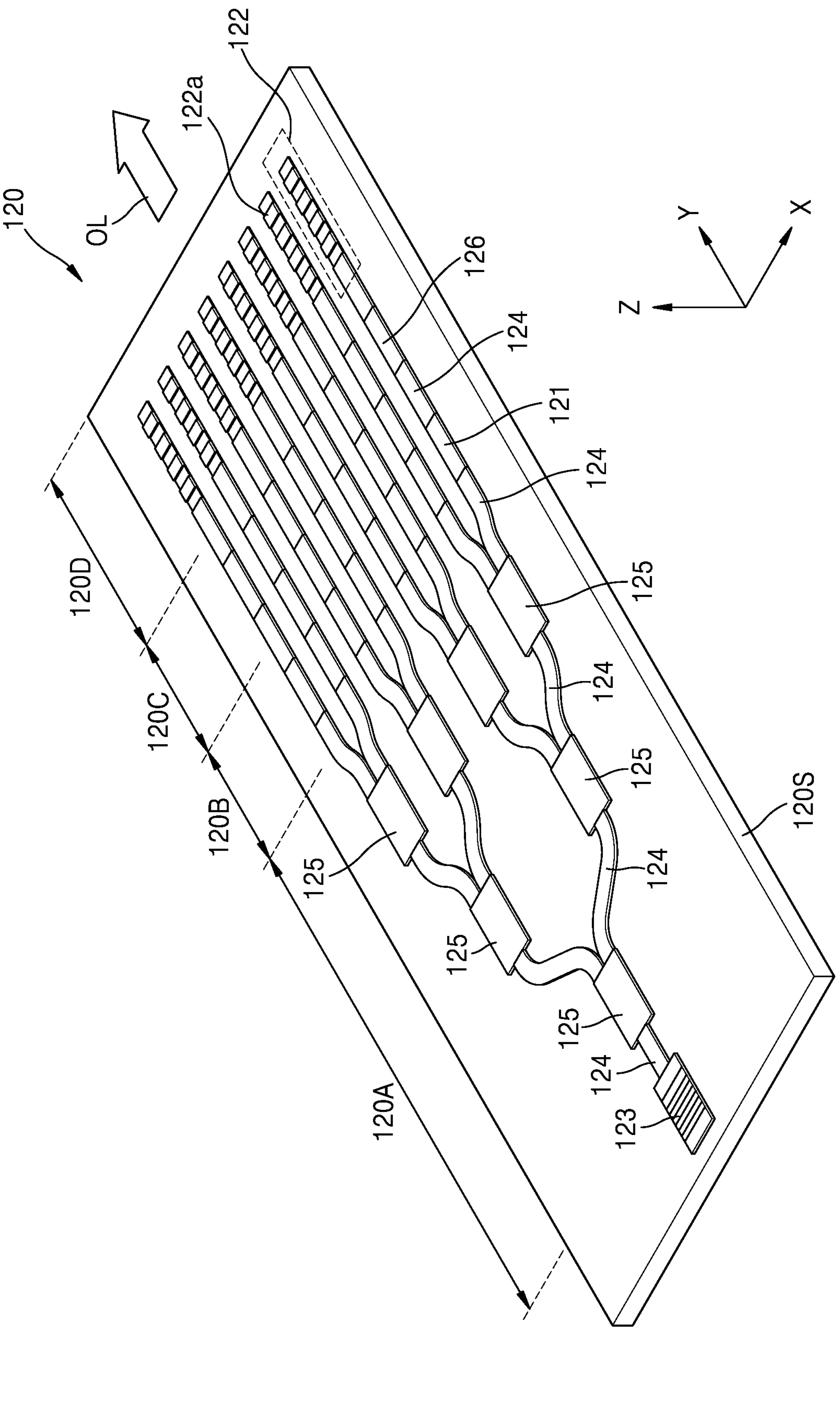
FIG. 5 is a perspective view illustrating an optical transmitter configured in the form of an optical integrated circuit on a substrate.

According to an example embodiment, the optical phased array of the optical transmitter 120 described above may be implemented as one photonic integrated circuit (PIC) on one substrate. FIG. 5 is a perspective view illustrating the optical transmitter 120 configured in the form of an optical integrated circuit on a substrate. Referring to FIG. 5, the optical transmitter 120 may include a substrate 120S, an input coupler 123 provided on the substrate 120S, a branch region 120A, a phase control region 120B, an amplifying region 120C, and an emission region 120D. The input coupler 123, the branch region 120A, the phase control region 120B, the amplifying region 120C, and the emission region 120D may be arranged in the second direction.

The input coupler 123 may serve to couple light coming from the light source module 110 to an optical path within the optical transmitter 120. In another example embodiment, the light source module 110 may be integrally provided on the substrate 120S of the optical transmitter 120. In this case, the light source module 110 may be provided at the position of the input coupler 123, and the input coupler 123 may be omitted.

The optical transmitter 120 may include a plurality of optical waveguides 124 that transmit light generated from the light source module 110 to the branch region 120A, the phase control region 120B, the amplifying region 120C, and the emission region 120D. According to an example the plurality of optical waveguides 124 may sequentially transmit light generated from the light source module 110 to the branch region 120A, the phase control region 120B, the amplifying region 120C, and the emission region 120D. Light generated by the light source module 110 may travel in the second direction through the optical waveguides 124.

The branch region 120A may include a plurality of light splitters 125. The plurality of light splitters 125 may split one light traveling along the optical waveguides 124 into several pieces of light. For example, one optical waveguide 124 may be connected to an input terminal of each light splitter 125 and a plurality of optical waveguides 124 may be connected to an output terminal of each light splitter 125. As an example, a plurality of light splitters 125 that each distributes one light beam into two light beams are shown in FIG. 5. Light may be divided into a plurality of pieces of light within the branching region 120A. The plurality of divided pieces of light respectively travel along the plurality of optical waveguides 124. Although it is shown in FIG. 5 that the light is divided into 8 pieces of light in the branch region 120A, this is simply an example and is not necessarily limited thereto.

The phase control region 120B may include a plurality of optical modulators 121 respectively provided in the plurality of optical waveguides 124. For example, the plurality of optical modulators 121 may be arranged in a first direction perpendicular to a second direction. A plurality of pieces of light divided in the branch region 120A may be respectively provided to the plurality of optical modulators 121. The optical modulator 121 may have a variable refractive index that is electrically controlled. Phases of light passing through the optical modulator 121 may be determined according to the refractive index of the optical modulator 121. The optical modulator 121 may independently control the phases of the divided pieces of light.

The amplifying region 120C may include a plurality of optical amplifiers 126 respectively provided in the plurality of optical waveguides 124. The plurality of optical amplifiers 126 may be arranged in the first direction perpendicular to the second direction. The optical amplifier 126 may increase the magnitude of an optical signal. For example, each optical amplifier 126 may include a semiconductor optical amplifier or an ion-doped amplifier.

The emission region 120D may include a plurality of grating antennas 122. The plurality of grating antennas 122 may be arranged in the first direction. The plurality of grating antennas 122 may be respectively connected to the plurality of optical amplifiers 126. Each of the plurality of grating antennas 122 may respectively emit light amplified in the amplifying region 120C. Accordingly, each of the plurality of grating antennas 122 may include a plurality of grating patterns 122*a* that are periodically arranged. The plurality of grating patterns 122*a* may be arranged in the second direction. The traveling direction of output light OL emitted by the emission region 120D may be determined by a phase difference between a plurality of divided pieces of light determined in the phase control region 120B and a wavelength of the light provided from the light source module 110. In particular, a first direction component of the output light OL (i.e., an azimuthal angle component) may be determined by a phase difference between a plurality of pieces of light, and a third direction component (i.e., an elevation angle component) of the output light OL may be determined by a wavelength of light.

FIG. 5 shows an example in which only the optical transmitter 120 is implemented with one optical integrated circuit according to an example embodiment. However, according to another example embodiment, components of the LIDAR apparatus 100 including the light source module 110, the optical transmitter 120, the optical receiver 130, the optical detector 140, and the processor 150 may all be implemented as one optical integrated circuit.

Figure 6:
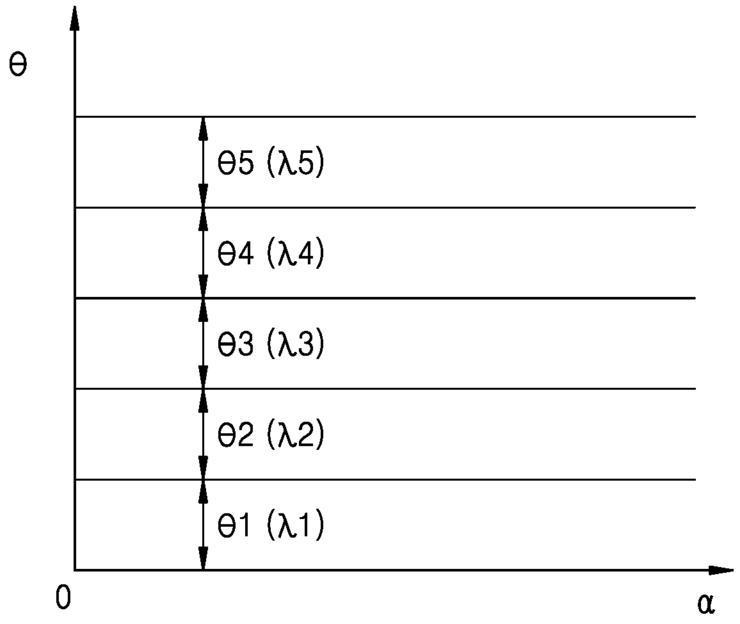
FIG. 6 is a diagram illustrating a scanning angle range of a LIDAR apparatus according to an example embodiment.

FIG. 6 is a diagram illustrating a scanning angle range of the LiDAR apparatus 100 according to an example embodiment. Referring to FIG. 6, the LiDAR apparatus 100 may perform two-dimensional scanning in an azimuth angle (α) direction and an elevation angle (θ) direction. According to an example embodiment, the LiDAR apparatus 100 may scan using light of a first wavelength band λ1 for a first elevation angle range θ1, may scan using light of a second wavelength band λ2 for a second elevation angle range θ2, scans using light of a third wavelength band λ3 for a third elevation angle range θ3, may scan using light of a fourth wavelength band λ4 for a fourth elevation angle range θ4, and may scan using light of a fifth wavelength band λ5 for a fifth elevation angle range θ5.

In general, because the effective wavelength tunable range of one tunable laser light source is small, the elevation angle range that may be scanned with one tunable laser light source is less than 10°. According to an example embodiment, the LiDAR apparatus 100 may greatly increase the elevation angle range capable of scanning by using a plurality of tunable laser light sources. In other words, by using a plurality of tunable laser light sources, a wavelength range of light provided to the optical transmitter 120 of the LiDAR apparatus 100 may be widened. Accordingly, the elevation angle direction scanning angle range of the LiDAR apparatus 100 may be widened.

Figure 7:
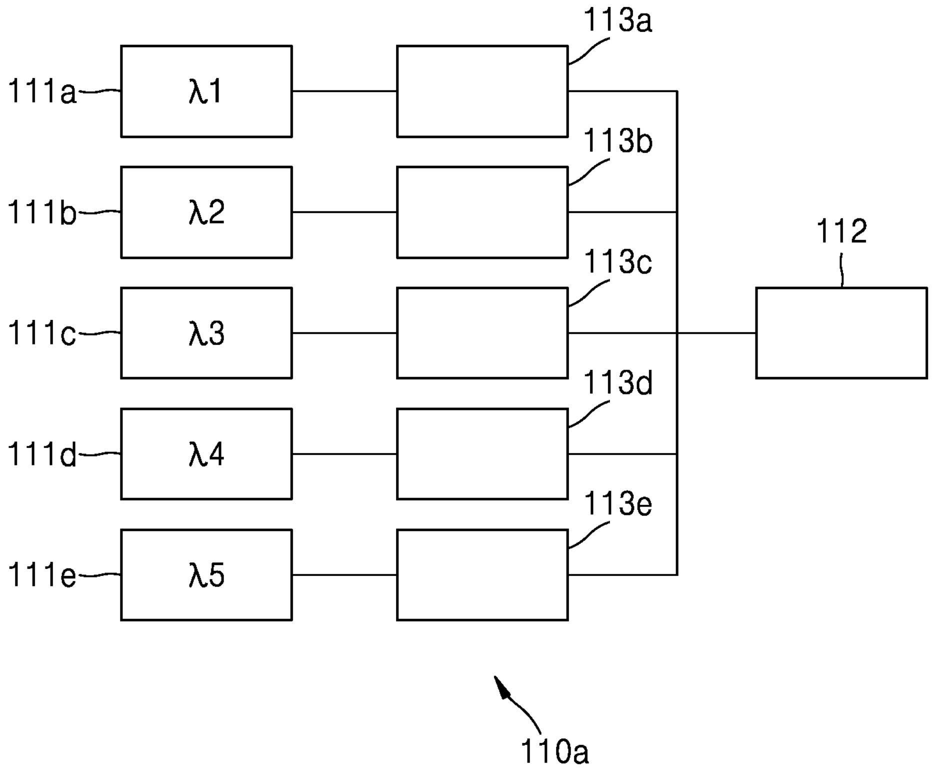
FIG. 7 is a schematic block diagram showing a configuration of a light source module of a LIDAR apparatus according to another example embodiment.

FIG. 7 is a schematic block diagram showing a configuration of a light source module 110*a* of the LiDAR apparatus 100 according to another example embodiment. Referring to FIG. 7, the light source module 110*a* may include a plurality of tunable laser light sources 111*a*, 111*b*, 111*c*, 111*d*, and 111*e*, a plurality of optical amplifiers 113*a*, 113*b*, 113*c*, 113*d*, and 113*e*, and a light selection element 112 that selects one light among pieces of light emitted from the plurality of optical amplifiers 113*a*, 113*b*, 113*c*, 113*d*, and 113*e*. Compared to the light source module 110 shown in FIG. 1, the light source module 110*a* shown in FIG. 7 may further include the plurality of optical amplifiers 113*a*, 113*b*, 113*c*, 113*d*, and 113*e* respectively provided between the plurality of tunable laser light sources 111*a*, 111*b*, 111*c*, 111*d*, and 111*e* and the light selection element 112.

For example, the light source module 110*a* may include the first wavelength optical amplifier 113*a* provided on an optical path between the first tunable laser light source 111*a* and the light selection element 112 to amplify light of the first wavelength band λ1 emitted from the first tunable laser light source 111*a*, the second wavelength optical amplifier 113*b* provided on an optical path between the second tunable laser light source 111*b* and the light selection element 112 to amplify light of the second wavelength band λ2 emitted from the second tunable laser light source 111*b*, the third wavelength optical amplifier 113*c* provided on an optical path between the third tunable laser light source 111*c* and the light selection element 112 to amplify light of the third wavelength band λ3 emitted from the third tunable laser light source 111*c*, the fourth wavelength optical amplifier 113*d* provided on an optical path between the fourth tunable laser light source 111*d* and the light selection element 112 to amplify light of the fourth wavelength band λ4 emitted from the fourth tunable laser light source 111*d*, and a fifth wavelength optical amplifier 113*e* provided on an optical path between the fifth tunable laser light source 111*e* and the light selection element 112 to amplify light of the fifth wavelength band λ5 emitted from the fifth tunable laser light source 111*e*.

Each of the first to fifth wavelength optical amplifiers 113*a*, 113*b*, 113*c*, 113*d*, and 113*e* may have the same configuration as the first optical amplifier 10 shown in FIG. 3. For example, each of the first to fifth wavelength optical amplifiers 113*a*, 113*b*, 113*c*, 113*d*, and 113*e* may include a lower contact layer, a gain material layer, and an upper contact layer. Gain material layers of the first to fifth wavelength optical amplifiers 113*a*, 113*b*, 113*c*, 113*d*, and 113*e* may have optimized structures and semiconductor compositions for the first to fifth wavelength bands λ1, λ2, λ3, λ4, and λ5 to be amplified. In other words, the composition and the band gap of semiconductor materials of the gain material layers of the first to fifth wavelength optical amplifiers 113*a*, 113*b*, 113*c*, 113*d*, and 113*e* may be different from each other. By using the first to fifth wavelength optical amplifiers 113*a*, 113*b*, 113*c*, 113*d*, and 113*e*, the intensity of light output from the light source module 110*a* may be optimally increased according to a wavelength.

Figure 8:
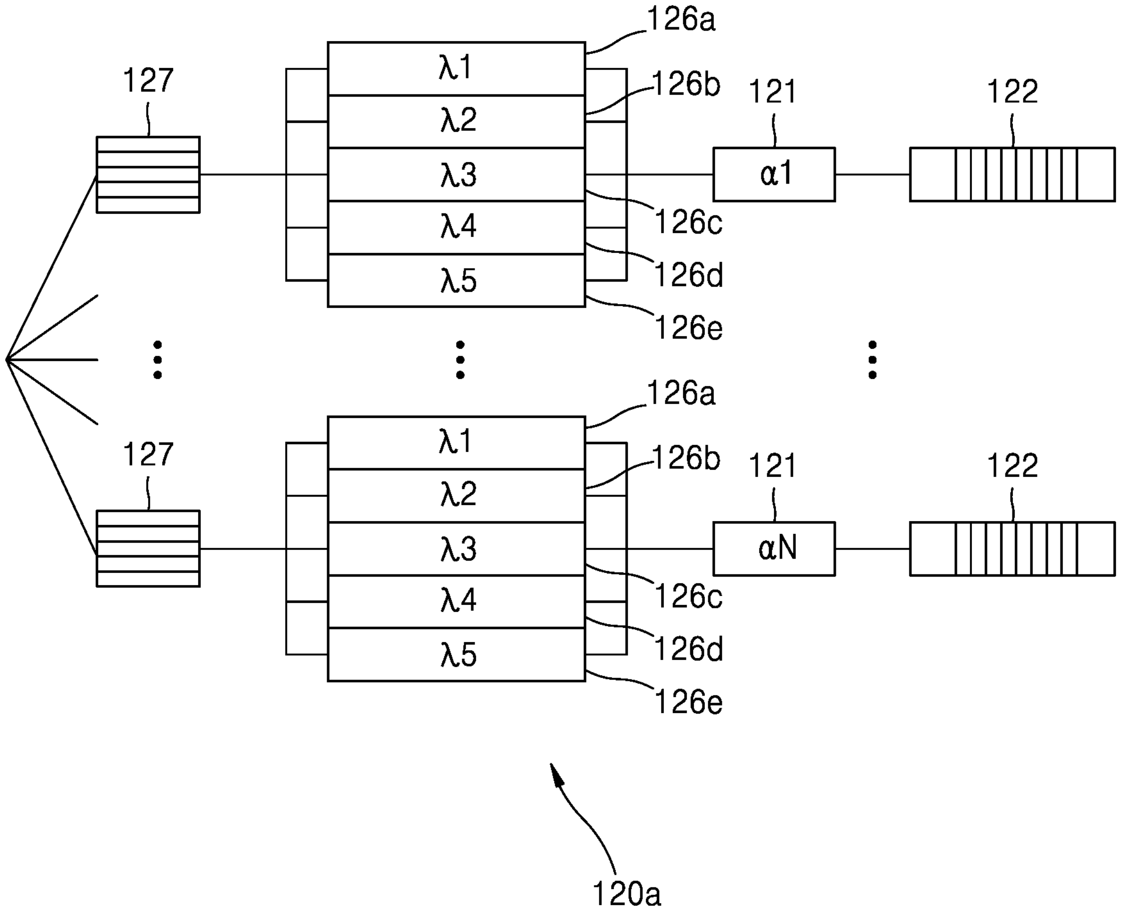
FIG. 8 is a schematic block diagram showing a configuration of an optical transmitter of a LIDAR apparatus according to another example embodiment.

FIG. 8 is a schematic block diagram showing a configuration of an optical transmitter 120*a* of a LIDAR apparatus according to another example embodiment. Referring to FIG. 8, the optical transmitter 120*a* may further include a first wavelength optical amplifier 126*a* that amplifies light of a first wavelength band λ1, a second wavelength optical amplifier 126*b* that amplifies light of a second wavelength band λ2, a third wavelength optical amplifier 126*c* that amplifies light of a third wavelength band λ3, a fourth wavelength optical amplifier 126*d* that amplifies light of a fourth wavelength band 4, and a fifth wavelength optical amplifier 126*e* that amplifies light of a fifth wavelength band λ5. In particular, the first to fifth wavelength optical amplifiers 126*a*, 126*b*, 126*c*, 126*d*, and 126*e* may be provided for each of the plurality of optical modulators 121 or each of the plurality of grating antennas 122. For example, when the light source module 110*a* includes five tunable laser light sources and the optical transmitter 120*a* includes N optical modulators 121 (N is a natural number greater than 1), the optical transmitter 120*a* may include 5N optical amplifiers. By using the first to fifth wavelength optical amplifiers 126*a*, 126*b*, 126*c*, 126*d*, and 126*e*, the intensity of light emitted to the outside of the LiDAR apparatus through the grating antenna 122 may be optimally increased according to a wavelength.

In addition, the optical transmitter 120*a* may include a plurality of wavelength selective switches 127. For example, a wavelength selective switch 127. may be provided for each of the plurality of optical modulators 121 or each of the plurality of grating antennas 122. Each of the a wavelength selective switches 127 transmits light of a first wavelength band λ1 to the first wavelength optical amplifier 126*a*, transmits light of a second wavelength band λ2 to the second wavelength optical amplifier 126*b*, transmits light of a third wavelength band λ3 to the third wavelength optical amplifier 126*c*, transmits light of a fourth wavelength band λ4 to the fourth wavelength optical amplifier 126*d*, and transmits light of a fifth wavelength band λ4 to the fifth wavelength optical amplifier 126*e* among incident light. The wavelength selective switch 127 may be, for example, an electrically controlled demultiplexer. Alternatively, the wavelength selective switch 127 may be implemented as a directional coupler, an echelle grating, or an AWG that diffracts a plurality of different wavelengths of light incident on the same path at different angles.

In FIG. 8, it is depicted that the first to fifth wavelength optical amplifiers 126*a*, 126*b*, 126*c*, 126*d*, and 126*e* are provided in front of the optical modulator 121 on the optical path, and the amplified light enters the optical modulator 121, but not limited thereto. For example, as shown in FIG. 5, the first to fifth wavelength optical amplifiers 126*a*, 126*b*, 126*c*, 126*d*, and 126*e* may be provided between the corresponding optical modulator 121 and the corresponding grating antenna 122 on an optical path. In addition, the wavelength selective switch 127 may be provided between the optical modulator 121 and the first to fifth wavelength optical amplifiers 126*a*, 126*b*, 126*c*, 126*d*, and 126*e* on the optical path.

Figure 9:
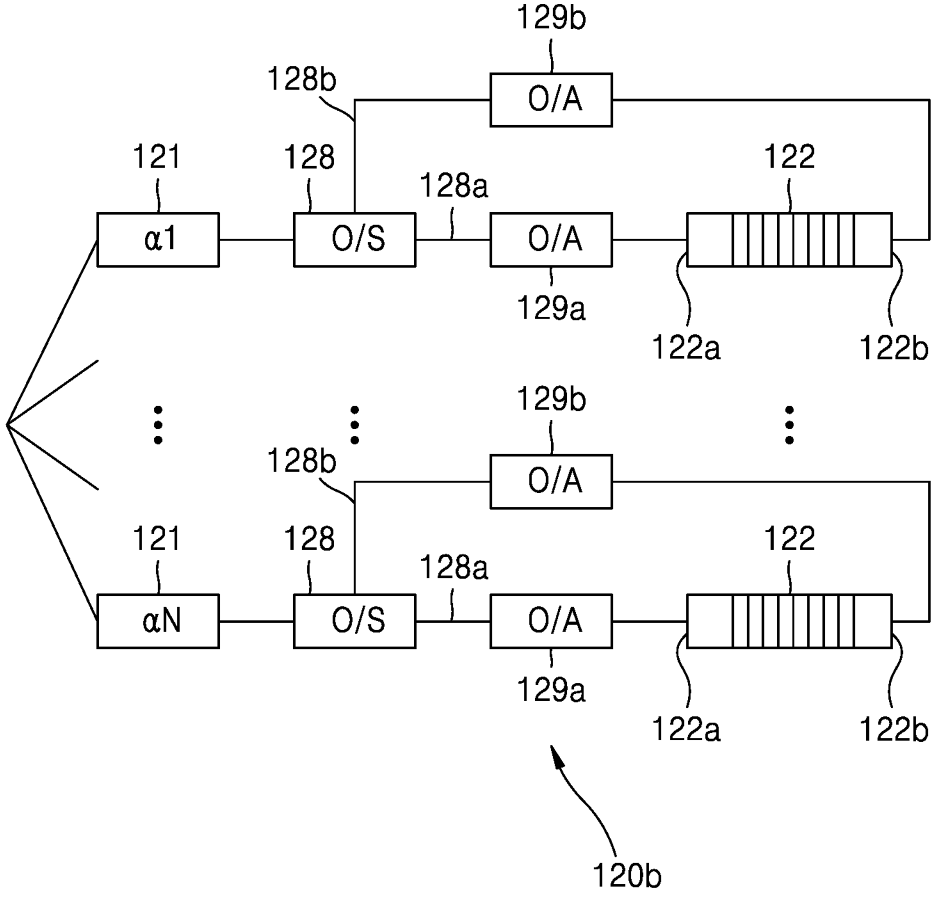
FIG. 9 is a schematic block diagram showing a configuration of an optical transmitter of a LIDAR apparatus according to another example embodiment.

FIG. 9 is a schematic block diagram showing a configuration of an optical transmitter 120*b* of a LiDAR apparatus according to another example embodiment. Referring to FIG. 9, the optical transmitter 120*b* may further include an optical switch 128 provided on an optical path between a grating antenna 122 and an optical modulator 121 that correspond to each other, among the plurality of grating antennas 122 and the plurality of optical modulators 121, a first optical attenuator 129*a* provided on an optical path between a first output terminal 128*a* of the optical switch 128 and a first end 122*a* of the grating antenna 122, and a second optical attenuator 129*b* provided on an optical path between a second output terminal 128*b* of the optical switch 128 and a second end 122*b* of the grating antenna 122. Accordingly, in the optical transmitter 120*b*, the number of optical switches 128, first optical attenuators 129*a*, and second optical attenuators 129*b* is equal to the number of grating antennas 122 and the number of optical modulators 121.

The optical switch 128 may be configured to output input light to one of the first output terminal 128*a* and the second output terminal 128*b* according to electrical control. For example, the optical switch 128 may output input light to the first output terminal 128*a* or the second output terminal 128*b* according to the control of the processor 150.

The first optical attenuator 129*a* and the second optical attenuator 129*b* may attenuate or pass light without attenuation according to electrical control. For example, when the optical switch 128 controls light to be output to the first output end 128*a*, the processor 150 may set the attenuation rate of the first optical attenuator 129*a* to minimum and the attenuation rate of the second optical attenuator 129*b* to maximum. Then, light from the first output terminal 128*a* of the optical switch 128 may be incident on the first end 122*a* of the grating antenna 122 via the first optical attenuator 129*a*. In this case, the second optical attenuator 129*b* may block light returning through the second end 122*b* of the grating antenna 122. In addition, when the optical switch 128 controls light to be output to the second output terminal 128*b*, the processor 150 may set the attenuation rate of the first optical attenuator 129*a* to maximum and set the attenuation rate of the second optical attenuator 129*b* to minimum. Then, light from the second output terminal 128*b* of the optical switch 128 may be incident on the second end 122*b* of the grating antenna 122 via the second optical attenuator 129*b*. In this case, the first optical attenuator 129*a* may block light returning through the first end 122*a* of the grating antenna 122.

Figure 10A:
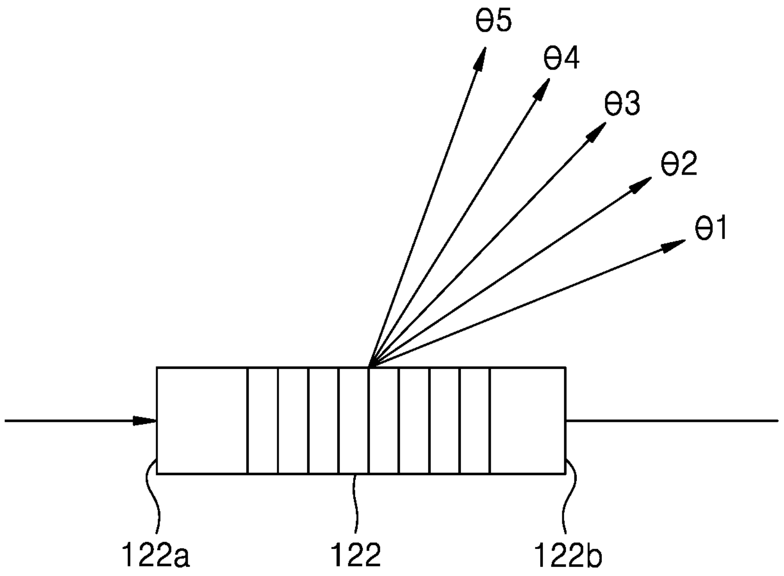
FIGS. 10A and 10B diagrams illustrating a beam scanning operation of an optical transmitter of the LiDAR apparatus shown in FIG. 9 as an example.
Figure 10B:
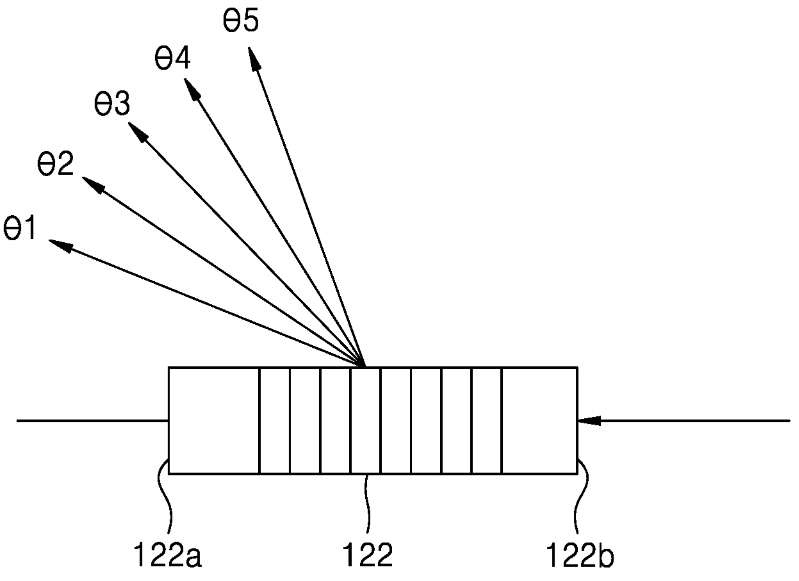

FIGS. 10A and 10B show a beam scanning operation of the optical transmitter 120*b* of the LiDAR apparatus shown in FIG. 9 as an example. Referring to FIG. 10A, when light is incident to the first end 122*a* of the grating antenna 122, the light may be steered toward the second end 122*b* of the grating antenna 122. Referring to FIG. 10B, when light is incident to the second end 122*b* of the grating antenna 122, the light may be steered toward the first end 122*a* of the grating antenna 122. Accordingly, the scanning angle range of the LiDAR apparatus may further be widened.

Figure 11:
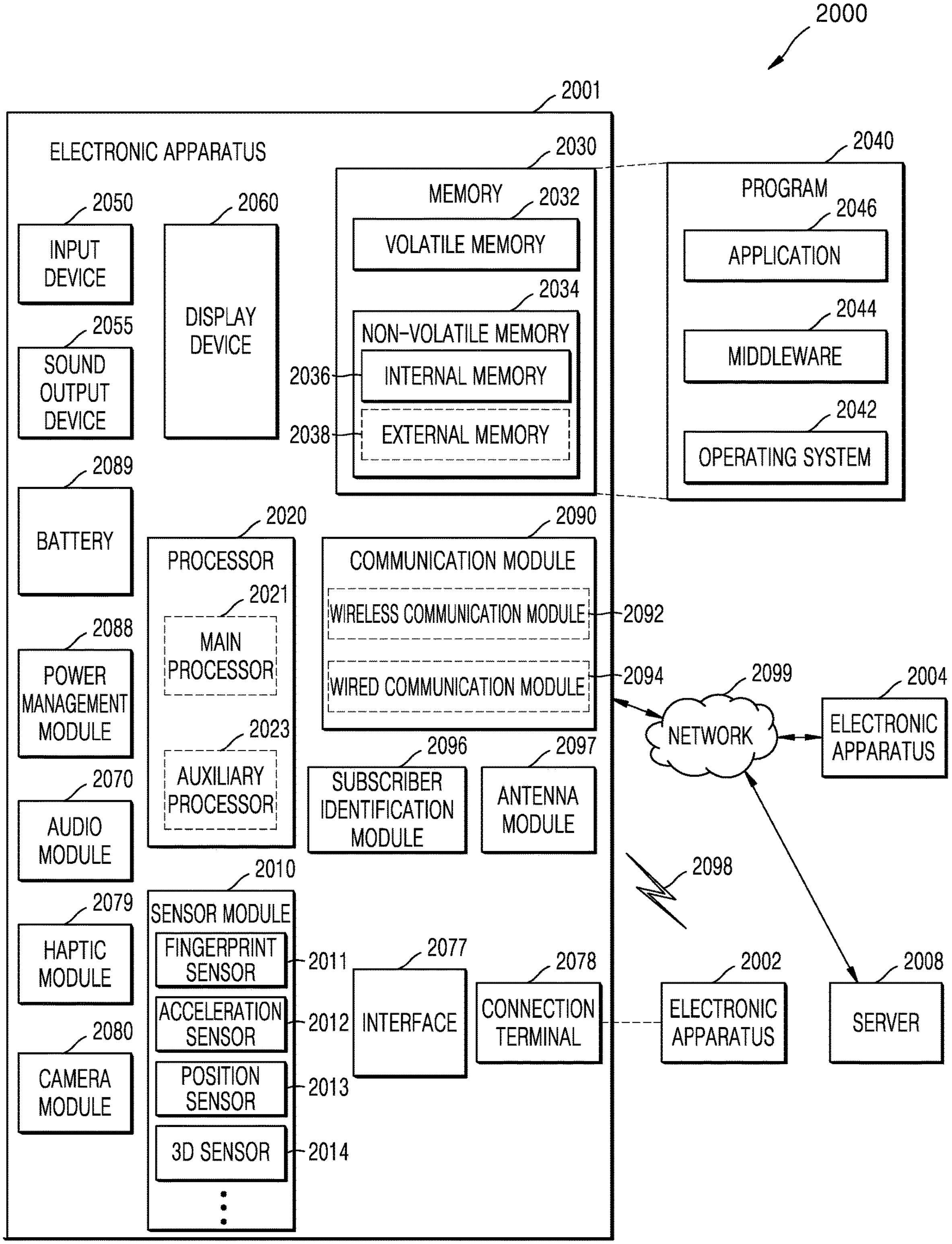
FIG. 11 is a schematic block diagram showing a configuration of an electronic apparatus including a LIDAR apparatus according to an example embodiment.

The LiDAR apparatus described above may be applied to various electronic apparatuses for detecting a distance to an external object or acquiring a 3D image. FIG. 11 is a schematic block diagram showing a configuration of an electronic apparatus including a LiDAR apparatus according to an example embodiment. Referring to FIG. 11, in a network environment 2000, an electronic device 2001 may communicate with another electronic apparatus 2002 through a first network 2098 (a short-distance wireless communication network, etc.) or communicate with another electronic apparatus 2004 and/or server 2008 via a second network 2099 (a long-distance wireless communication network, etc.). The electronic apparatus 2001 may communicate with the electronic apparatus 2004 through the server 2008. The electronic apparatus 2001 may include a processor 2020, a memory 2030, an input device 2050, an audio output device 2055, a display device 2060, an audio module 2070, a sensor module 2010, an interface 2077, a haptic module 2079, a camera module 2080, a power management module 2088, a battery 2089, a communication module 2090, a subscriber identification module 2096, and/or an antenna module 2097. In the electronic apparatus 2001, some of these components (such as the display device 2060) may be omitted or other components may be added. Some of these components may be implemented as a single integrated circuit. For example, a fingerprint sensor 2011 of the sensor module 2010, an iris sensor, or an illumination sensor may be implemented by being embedded in the display device 2060 (a display, etc.).

The processor 2020 may control one or a plurality of other components (hardware, software components, etc.) of the electronic apparatus 2001 connected to the processor 2020 by executing software (a program 2040, etc.), and may perform various data processing or calculations. As part of data processing or calculations, the processor 2020 may load commands and/or data received from other components (the sensor module 2010, the communication module 2090, etc.) into a volatile memory 2032 and process the commands and/or data stored in the volatile memory 2032 and resulting data may be stored in a non-volatile memory 2034. The processor 2020 may include a main processor 2021 (central processing unit, application processor, etc.) and an auxiliary processor 2023 (graphics processing unit, image signal processor, sensor hub processor, communication processor, etc.) that may be operated independently or together with the main processor 2021. The auxiliary processor 2023 may use less power than the main processor 2021 and perform specialized functions.

The auxiliary processor 2023 may control functions and/or states related to some of the components (the display device 2060, the sensor module 2010, the communication module 2090, etc.) of the electronic apparatus 2001 in place of the main processor 2021 while the main processor 2021 is in an inactive state (a sleep state) or together with the main processor 2021 while the main processor 2021 is in an active state (an application execution state). The auxiliary processor 2023 (an image signal processor, a communication processor, etc.) may be implemented as part of other functionally related components (the camera module 2080, the communication module 2090, etc.).

The memory 2030 may store various data required by components (the processor 2020, the sensor module 2010, etc.) of the electronic apparatus 2001. Data may include, for example, input data and/or output data for software (the program 2040, etc.) and instructions related the software. The memory 2030 may include a volatile memory 2032 and/or a non-volatile memory 2034.

The program 2040 may be stored as software in the memory 2030 and may include an operating system 2042, middleware 2044, and/or applications 2046.

The input device 2050 may receive commands and/or data to be used for a component (the processor 2020, etc.) of the electronic apparatus 2001 from the outside of the electronic apparatus 2001 (a user, etc.). The input device 2050 may include a microphone, mouse, keyboard, and/or digital pen (a stylus pen, etc.).

The audio output device 2055 may output sound signals to the outside of the electronic apparatus 2001. The audio output device 2055 may include a speaker and/or a receiver. The speaker may be used for general purposes, such as multimedia playback or recording playback, and the receiver may be used to receive an incoming call. The receiver may be coupled as a part of the speaker or implemented as an independent separate device.

The display device 2060 may visually provide information to the outside of the electronic apparatus 2001. The display device 2060 may include a display, a hologram device, or a projector and a control circuit for controlling the device. The display device 2060 may include a touch circuitry set to sense a touch and/or a sensor circuit (such as a pressure sensor) set to measure the strength of a force generated by a touch.

The audio module 2070 may convert sound into an electrical signal or vice versa. The audio module 2070 may obtain a sound through the input device 2050, or output a sound through a speaker and/or headphone of another electronic apparatus (such as the electronic apparatus 2002) connected directly or wirelessly to the audio output device 2055 and/or the electronic apparatus 2001.

The sensor module 2010 may detect an operation state (power, temperature, etc.) of the electronic apparatus 2001 or an external environmental state (user state, etc.), and generates an electrical signal and/or data value corresponding to the detected state. The sensor module 2010 may include a fingerprint sensor 2011, an acceleration sensor 2012, a position sensor 2013, a 3D sensor 2014, and the like, and besides above, may include an iris sensor, a gyro sensor, an air pressure sensor, a magnetic sensor, a grip sensor, a proximity sensor, a color sensor, an IR (Infrared) sensor, a biological sensor, a temperature sensor, a humidity sensor, and/or an illuminance sensor.

The 3D sensor 2014 senses a shape and movement of an object by irradiating a predetermined light onto the object and analyzing light reflected from the object, and may include the LiDAR apparatus 100 according to the embodiment described above.

The interface 2077 may support at least one designated protocol that may be used to directly or wirelessly connect the electronic apparatus 2001 to another electronic apparatus (e.g., the electronic apparatus 2002). The interface 2077 may include a high definition multimedia interface (HDMI), a universal serial bus (USB) interface, an SD card interface, and/or an audio interface.

A connection terminal 2078 may include a connector through which the electronic apparatus 2001 may be physically connected to another electronic apparatus (such as the electronic apparatus 2002). The connection terminal 2078 may include an HDMI connector, a USB connector, an SD card connector, and/or an audio connector (such as a headphone connector).

The haptic module 2079 may convert an electrical signal into mechanical stimuli (vibration, movement, etc.) or electrical stimuli that a user may recognize through tactile or kinesthetic senses. The haptic module 2079 may include a motor, a piezoelectric element, and/or an electrical stimulation device.

The camera module 2080 may capture still images and moving images. The camera module 2080 may include a lens assembly including one or more lenses, image sensors, image signal processors, and/or flashes. The lens assembly included in the camera module 2080 may collect light emitted from an object that is an image capture target, The power management module 2088 may manage power supplied to the electronic apparatus 2001. The power management module 388 may be implemented as part of a Power Management Integrated Circuit (PMIC).

The battery 2089 may supply power to components of the electronic apparatus 2001. The battery 2089 may include a non-rechargeable primary cell, a rechargeable secondary cell, and/or a fuel cell.

The communication module 2090 may establish a direct (wired) communication channel and/or wireless communication channel between the electronic apparatus 2001 and other electronic apparatuses (electronic apparatus 2002, electronic apparatus 2004, server 2008, etc.), may support communication through the established communication channel. The communication module 2090 may include one or more communication processors that are independently operated from the processor 2020 (application processor, etc.) and support direct communication and/or wireless communication. The communication module 2090 may include a wireless communication module 2092 (a cellular communication module, a short-range wireless communication module, a Global Navigation Satellite System (GNSS), etc.) communication module) and/or a wired communication module 2094 (a Local Area Network (LAN) communication module, a power line communication module, etc.). Among these communication modules, a corresponding communication module may communicate with other electronic devices through the first network 2098 (a short-range communication network, such as Bluetooth, WiFi Direct, or Infrared Data Association (IrDA)) or the second network 2099 (a telecommunication network, such as a cellular network, the Internet, or a computer network (LAN) and WAN, etc.). The various types of communication modules may be integrated into one component (a single chip, etc.) or implemented as a plurality of components (plural chips) separate from each other. The wireless communication module 2092 may identify and authenticate the electronic apparatus 2001 within a communication network, such as the first network 2098 and/or the second network 2099 by using subscriber information (such as, International Mobile Subscriber Identifier (IMSI)) stored in a subscriber identification module 2096.

The antenna module 2097 may transmit or receive signals and/or power to and from the outside (other electronic devices, etc.). The antenna may include a radiator having a conductive pattern formed on a substrate (PCB, etc.). The antenna module 2097 may include one or a plurality of antennas. When a plurality of antennas is included in the antenna module 2097, an antenna suitable for a communication method used in a communication network, such as the first network 2098 and/or the second network 2099 from among the plurality of antennas may be selected by the communication module 2090. Signals and/or power may be transmitted or received between the communication module 2090 and another electronic device through the selected antenna. In addition to the antenna, other components (an RFIC, etc.) may be included as a part of the antenna module 2097.

Some of the components are connected to each other through a communication method between peripheral devices (a bus, a General Purpose Input and Output (GPIO), a Serial Peripheral Interface (SPI), a Mobile Industry Processor Interface (MIPI), etc.), and may interchange signals (commands, data, etc.).

The command or data may be transmitted or received between the electronic apparatus 2001 and the external electronic apparatus 2004 through the server 2008 connected to the second network 2099. The other electronic apparatuses 2002 and 2004 may be the same or different types of electronic apparatus 2001. All or some of operations performed in the electronic apparatus 2001 may be performed in one or more of the other electronic apparatuses 2002, 2004, and 2008. For example, when the electronic apparatus 2001 needs to perform a function or service, the electronic apparatus 2001 may request one or more other electronic devices to perform part or all function or service instead of executing the function or service itself. One or more other electronic devices receiving the request may execute an additional function or service related to the request, and transmit a result of the execution to the electronic apparatus 2001. For this purpose, cloud computing, distributed computing, and/or client-server computing technologies may be used.

Figure 12:
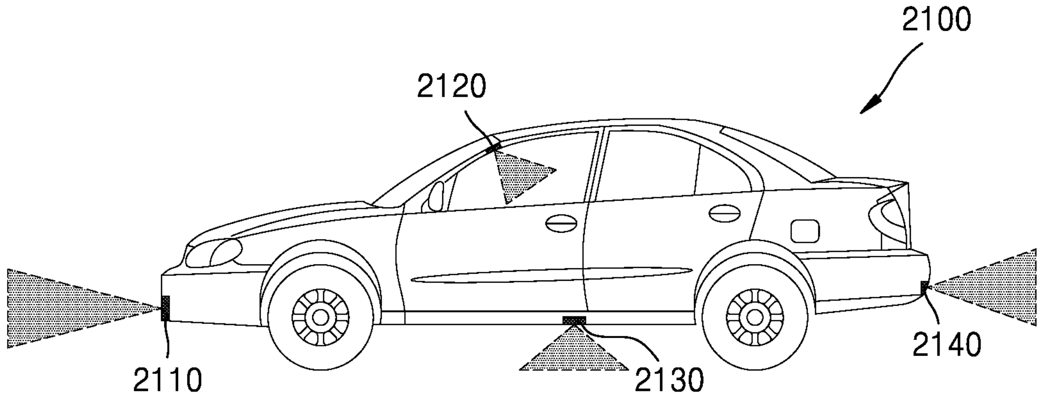
FIG. 12 is a diagram schematically showing an example in which a LiDAR apparatus is applied to a vehicle.

FIG. 12 is a diagram schematically showing an example in which LiDAR apparatuses are applied to a vehicle 2100. Referring to FIG. 12, the vehicle 2100 may include a plurality of LiDAR apparatuses 2110, 2120, 2130, and 2140 provided in various locations. The vehicle 2100 may provide various pieces of information about the surroundings of the vehicle 2100 to the driver using a plurality of LiDAR apparatuses 2110, 2120, 2130, and 2140, and may provide information necessary for autonomous driving by automatically recognizing objects or people around the vehicle 2100. The plurality of LiDAR apparatuses 2110, 2120, 2130, and 2140 may be the LiDAR apparatus 100 according to the embodiment shown in FIG. 9.

A LIDAR apparatus having a wide scanning angle range has been described with reference to the embodiment shown in the drawings. However, it will be understood by those of ordinary skill in the art that various changes in form and details may be made therein without departing from the spirit and scope of the disclosure. Therefore, the embodiments should be considered in descriptive sense only and not for purposes of limitation. The scope of the disclosure is defined not by the detailed description of the disclosure but by the appended claims, and all differences within the scope will be construed as being included in the disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A LiDAR apparatus comprising:
 a light source module configured to generate light;
 an optical transmitter configured to emit the light generated by the light source module to outside the LiDAR apparatus;

an optical receiver configured to receive light from outside the LiDAR apparatus;
 an optical detector configured to detect the light received by the optical receiver; and
 a processor configured to control an operation of each of the light source module and the optical transmitter,
 wherein the light source module comprises:
  a first tunable laser light source configured to emit first light in a first wavelength band;
  a second tunable laser light source configured to emit second light in a second wavelength band different from the first wavelength band; and
  a light selection element configured to select and output one of the first light and the second light,
  wherein the processor is further configured to turn on one of the first tunable laser light source and the second tunable laser light source, and control an emission wavelength of the turned-on tunable laser light source according to an elevation angle of a scanning light.

2. The LiDAR apparatus of claim 1, wherein the light selection element comprises one of a micro-electro mechanical system (MEMS) device, a Mach-Zehnder interferometer, and Liquid crystal on silicon (LCoS) for optically connecting one input terminal selected from a plurality of input terminals to one output terminal under control of the processor.

3. The LiDAR apparatus of claim 1, wherein the light selection element comprises:
 an optical combiner configured to couple light from a plurality of optical paths into one optical path, or
 a wavelength selective switch configured to diffract incident light of a plurality of different wavelengths at different angles.

4. The LiDAR apparatus of claim 1, wherein each of the first tunable laser light source and the second tunable laser light source comprise:
 a first optical waveguide and a second optical waveguide that are arranged parallel to each other in a first direction, the first optical waveguide and the second optical waveguide extending in a second direction perpendicular to the first direction;
 a first optical amplifier provided on the first optical waveguide;
 a second optical amplifier provided on the second optical waveguide and facing the first optical amplifier at a distance in the first direction;
 a first ring resonator provided between the first optical waveguide and the second optical waveguide, the first ring resonator facing a first end of the first optical amplifier and a first end of the second optical amplifier; and
 a second ring resonator provided between the first optical waveguide and the second optical waveguide, the second ring resonator facing a second end of the first optical amplifier and a second end of the second optical amplifier.

5. The LiDAR apparatus of claim 4, wherein a first diameter of the first ring resonator of the first tunable laser light source is different from a second diameter of the first ring resonator of the second tunable laser light source, and a third diameter of the second ring resonator of the first tunable laser light source is different from a fourth diameter of the second ring resonator of the second tunable laser light source.

6. The LiDAR apparatus of claim 4, wherein each of the first optical amplifier and the second optical amplifier comprise:

a lower contact layer, a gain material layer provided on the lower contact layer, and an upper contact layer provided on the gain material layer.

7. The LiDAR apparatus of claim 6, wherein the gain material layer of the first tunable laser light source comprises a first semiconductor material having a first composition and a first band gap, wherein the gain material layer of the second wavelength optical amplifier comprises a second semiconductor material having a second composition and a second band gap, and wherein the second composition is different from the first composition and the second band gap is different from the first band gap.

8. The LiDAR apparatus of claim 4, wherein each of the first tunable laser light source and the second tunable laser light source further comprise:

a first resonant wavelength control element configured to adjust a resonant wavelength of the first ring resonator, and a second resonant wavelength control element configured to adjust a resonant wavelength of the second ring resonator.

9. The LiDAR apparatus of claim 1, wherein the first wavelength band and the second wavelength band partially overlap each other.

10. The LiDAR apparatus of claim 1, wherein an interval between a central wavelength of the first tunable laser light source and a central wavelength of the second tunable laser light source is in a range from about 10 nm to about 60 nm, and a full width at half maximum of the central wavelength of each of the first tunable laser light source and emission wavelength bands of the second tunable laser light source is in a range from about 40 nm to about 60 nm.

11. The LiDAR apparatus of claim 1, wherein the processor is further configured to:

turn on the first tunable laser light source and turn off the second tunable laser light source, or turn off the first tunable laser light source and turn on the second tunable laser light source.

12. The LiDAR apparatus of claim 1, wherein the light source module further comprises:

a first wavelength optical amplifier provided on an optical path between the first tunable laser light source and the light selection element to amplify light of a first wavelength band emitted from the first tunable laser light source; and a second wavelength optical amplifier provided on an optical path between the second tunable laser light source and the light selection element to amplify light of a second wavelength band emitted from the second tunable laser light source.

13. The LiDAR apparatus of claim 12, wherein each of the first wavelength optical amplifier and the second wavelength optical amplifier comprise:

a lower contact layer, a gain material layer provided on the lower contact layer, and an upper contact layer provided on the gain material layer, wherein the gain material layer of the first wavelength optical amplifier comprises a first semiconductor material having a first composition and a first band gap, wherein the gain material layer of the second wavelength optical amplifier comprises a second semiconductor material having a second composition and a second band gap, and wherein the second composition is different from the first composition and the second band gap is different from the first band gap.

14. The LiDAR apparatus of claim 4, wherein the optical transmitter comprises:

a plurality of optical modulators arranged in the first direction; and a plurality of grating antennas provided adjacent to a corresponding optical modulator among the plurality of optical modulators in a second direction perpendicular to the first direction and arranged in the first direction.

15. The LiDAR apparatus of claim 14, wherein the optical transmitter further comprises:

a first wavelength optical amplifier provided for each of the plurality of optical modulators or each of the plurality of grating antennas to amplify light of the first wavelength band; and a second wavelength optical amplifier provided for each of the plurality of optical modulators or each of the plurality of grating antennas to amplify light of the second wavelength band.

16. The LiDAR apparatus of claim 15, wherein the optical transmitter further comprises a wavelength selective switch configured to:

transmit light of a first wavelength band among incident light to the first wavelength optical amplifier, and transmit light of the second wavelength band to the second wavelength optical amplifier.

17. The LiDAR apparatus of claim 16, wherein the wavelength selective switch is one of a demultiplexer, a directional coupler, an echelle grating, and an arrayed waveguide grating.

18. The LiDAR apparatus of claim 14, wherein the optical transmitter further comprises:

an optical switch provided on an optical path between a grating antenna, among the plurality of grating antennas and an optical modulator, among the plurality of optical modulators;

a first optical attenuator provided on an optical path between a first output end of the optical switch and a first end of the grating antenna; and a second optical attenuator provided on an optical path between a second output end of the optical switch and a second end of the grating antenna.

19. The LiDAR apparatus of claim 18, wherein the processor is further configured to:

set an attenuation rate of the first optical attenuator to minimum and set an attenuation rate of the second optical attenuator to maximum when controlling the optical switch to output light to a first output terminal, and set the attenuation rate of the first optical attenuator to maximum and set the attenuation rate of the second optical attenuator to minimum when controlling the optical switch output light to a second output terminal.

* * * * *